United States Patent [19]
Swars

[11] Patent Number: 5,086,660
[45] Date of Patent: Feb. 11, 1992

[54] GEARWHEEL ATTACHED TO AN EXPANDED TUBE

[75] Inventor: Helmut Swars, Bergisch Gladbach, Fed. Rep. of Germany

[73] Assignee: Emitec Gesellschaft für Emissionstechnologie mbH, Lohmar, Fed. Rep. of Germany

[21] Appl. No.: 660,158

[22] Filed: Feb. 21, 1991

Related U.S. Application Data

[63] Continuation of Ser. No. 315,527, Feb. 24, 1989, abandoned.

[30] Foreign Application Priority Data

Feb. 24, 1988 [DE] Fed. Rep. of Germany ....... 3805777

[51] Int. Cl.$^5$ .............................................. F16H 55/12
[52] U.S. Cl. ......................................... 74/446; 74/439
[58] Field of Search ........................... 74/446, 497, 439

[56] References Cited

U.S. PATENT DOCUMENTS

| 929,379 | 7/1909 | Birnbaum | 74/447 |
|---|---|---|---|
| 1,173,289 | 2/1916 | McKee et al. | 74/439 |
| 2,069,411 | 2/1937 | Keese | 74/447 |
| 3,186,247 | 6/1965 | Burnell | 74/447 X |
| 3,318,169 | 5/1967 | Tronslien | 74/439 X |
| 3,651,708 | 3/1972 | Muller | 74/447 |
| 4,464,949 | 8/1984 | Concina | 74/439 X |

FOREIGN PATENT DOCUMENTS

| 1059334 | 12/1983 | U.S.S.R. | 74/446 |
|---|---|---|---|
| 1087727 | 4/1984 | U.S.S.R. | 74/446 |

*Primary Examiner*—Jose V. Chen
*Attorney, Agent, or Firm*—Toren, McGeady & Associates

[57] ABSTRACT

A gearwheel attached to an expanded tube portion in a force-locking way, and including at least one plate metal disc member having a cylindrical hub portion on which a supporting ring is slid which has a yield strength higher than that of the tube portion, and at least one gear ring attached to the disc member.

13 Claims, 3 Drawing Sheets

GEARWHEEL ATTACHED TO AN EXPANDED TUBE

This is a continuation-in-part application of Ser. No. 07/315,527, filed Feb. 24, 1989, now abandoned.

BACKGROUND OF THE INVENTION

The invention relates to a gearwheel attached to an expanded tube portion in a force-locking way.

The process of fixing gearwheels on hollow shafts by hydraulic expansion of same is described in DE 38 03 684. In which process the gearwheels have a solid, prior art design to be able to provide elastic resistance to the pressure generated by the expanded tube. As in the case of shrunk or soldered connections, the hub portion may have a purely cylindrical shape. The gearwheels produced as castings or forgings disadvantageously increase the weight and mass inertia moment of the actually lightweight hollow shaft.

DE 35 30 190 A 1 describes a gearwheel which is made of plastic and which, in order to increase stability, has been provided with a steel inset which is bent at right angles several times and which is located on a journal with a hub portion. This hub portion has been provided with a groove to permit the form-fitting engagement of a feather key. A supporting ring slid on to the hub portion serves to prevent the hub portion from bending during the course of producing a force-locking connection produced at the end faces of the gearwheel by means of which the latter is attached via a bolt to a shaft portion. The supporting ring does not accommodate any radial forces.

From DE-OS 28 26 022 a power distributing drive is known in the case of which, in the regon of the gearwheels, thickened shafts and hollow shafts provided with gearwheels are used. Any special features of the connection are not identifiable and the gearwheels are solid.

SUMMARY OF THE INVENTION

It is an object of the present invention to provide a gearwheel which is suitable for the above-mentioned application and which is particularly easy and cheap to produce, and which is further of lightweight design and yet securely attached. Pursuant to this object, and others which will become apparent hereafter, one aspect of the present invention resides in a plate metal disc member having a cylindrical hub portion, a supporting ring which is slid thereupon and whose yield strength is higher than that of the tube portion, and at least one gear ring attached to the disc member. Depending on the materials paired, it may be advantageous if the modulus of elasticity of the supporting ring, too, is higher than that of the tube portion. Although lighter and cheaper materials are used for the disc member, the resulting design is suitable for applying the abovementioned method of fixing because during the course of plastically expanding the tube portion, the loosely slid-on supporting ring generates the necessary pre-tensioning forces and radially clamps in the hub portion.

The gearwheel member may consist of one single disc member which is Z-shaped or C-shaped or possibly deformed axially or of several disc members fitted together to have a closed shape relative to the tube member. Again, the individual disc members, even if they are deformed axially, may have a Z-shaped or C-shaped or even L-shaped longitudinal section, with each of the disc members having been provided with a cylindrical hub portion for the above-described connection with the tube member. Providing one or several external cylindrical or slightly conical outer portions with gear rings seated on each one is advantageous but not essential. For reinforcing purposes it is possible to provide reinforcing ribs which at the same time provide direct or indirect support for the gear ring.

Fixing the gear ring externally on the disc member may be effected in different ways, for instance by conventional pressing, shrinking, soldering or welding operations.

However, in a particularly advantageous embodiment of the invention there is provided a cylindrical or possibly conical outer portion at the disc member on to which the adapted gear ring is positioned and into which a matching supporting or expanding ring is inserted. With this type of connection of the disc member, plastic deformation of the supporting or expanding ring is possible, especially if the outer portion at the disc member has a cylindrical shape. It is also possible to produce an exclusive clamping connection by axially inserting the supporting or expanding ring, especially if the contact faces have a conical shape with an opening angle int he range of self-restraint. A further alternative, with an inserted supporting or clamping ring, consists in fixing the gear ring on the disc member by rolling or a similar process.

DETAILED DESCRIPTION OF THE PREFERRED EMBODIMENTS

Figure 1:
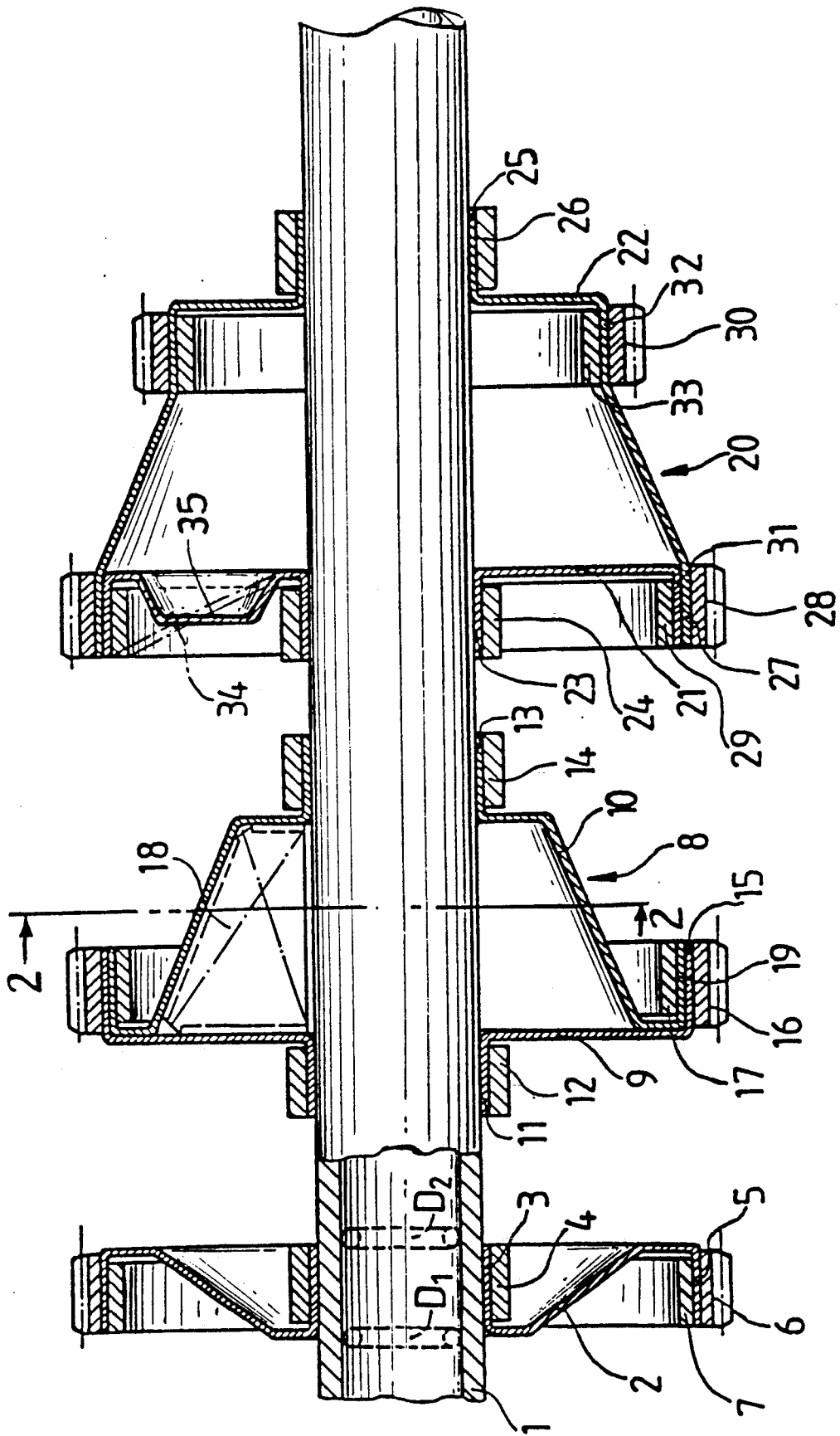
FIG. 1 is a longitudinal section of a tube member to which three gearwheels of a first embodiment pursuant to the present invention have been attached.

In FIG. 1, on the left side, there has been a slid on a gearwheel member consisting of one single disc member 2 with a Z-shaped longitudinal section and provided with a cylindrical hub portion 3 in direct contact with the tube member 1. A supporting ring 4 has been slid on to the hub portion 3. After plastic expansion of the tube portion 1, the supporting ring 4 clamps in the hub portion 3 in the region limited by seals $D_1$, $D_2$, illustrated in dashed lines. On its outside, the disc member 2 comprises a cylindrical outer portion 5 whereupon a gear ring 6 has been slid which is tensioned by a pressed-in expanding ring 7. The connection between the outer cylindrical portion 5 and the gear ring 6 may also be of the form-fitting type.

In the center, there is illustrated a closed shape gearwheel member 8 which is composed of a Z-shaped disc member 9 and a deformed C-shaped disc member 10. The disc member 9 comprises a cylindrical hub portion 11 located on the tubular member 1. A supporting ring 12 has been slid on to the hub portion 11 which supporting ring 12, after plastic expansion of the tubular portion, clamps in the hub portion 11. The disc member 10 comprises a hub portion 13 which extends in the opposite direction, embraces the tubular portion 1 and on to which a supporting ring 14 has been slid which, after plastic expansion of the tubular portion 1, clamps in the hub portion 13 in the respective region. The disc member 9, radially outwardly, has been provided with a cylindrical outer portion 15 on to which there has been slid a gear ring 16 secured via an expanding or supporting ring 17. The second disc member 10 comprises a cylindrical outer portion 19 which extends in the same direction as the inner hub portion 13, which extends into the cylindrical outer portion 15 and is clamped in together with the latter between the supporting ring or clamping ring 17 and the gear ring 16. As illustrated in the upper half of the drawing, it is possible to provide reinforcing ribs 18, either individually or in a continuous form, which with knurled edges, rest against the inside of the disc member 8.

On the right side of the figure, there is illustrated a third gearwheel member 20 which again has a closed shape relative to the tubular member and consists of a first C-shaped disc member 21 and a deformed double-Z-shaped disc member 22. A cylindrical hub portion 23 holding a supporting ring 24 clamping in the respective axial region of the hub portion after plastic expansion of the tubular portion has been formed on to the disc member 21. The disc member 22 comprises a hub portion 25 extending in the opposite direction, on to which there has been slid a supporting ring 26 which, after plastic expansion of the tubular portion 1, carries out the required function. A gear ring 28 has been slid on to the first cylindrical outer portion 27 of the disc member 22, with a supporting, expanding or clamping ring 29 clamping in the outer portion 27 relative to the gear ring 28, together with a cylindrical outer portion 31 of the disc member 21 engaging the outer portion 27. The design is similar to that of the central disc. A further gear ring 30 is located on an axially and radially offset cylindrical outer portion 32 of the disc member 22 into which an expanding, clamping or supporting ring 33 has been inserted. As indicated in the upper half of the drawing of the drawing, the C-shaped disc member 21 may be replaced by a Z-shaped disc member 34. The cylindrical outer portions on which the gear rings are located may also have a conical shape, in which case the clamping rings will have a correspondingly conical shape with opening angles in the region of self-restraint and with a slight radial excess dimension.

Figure 2:
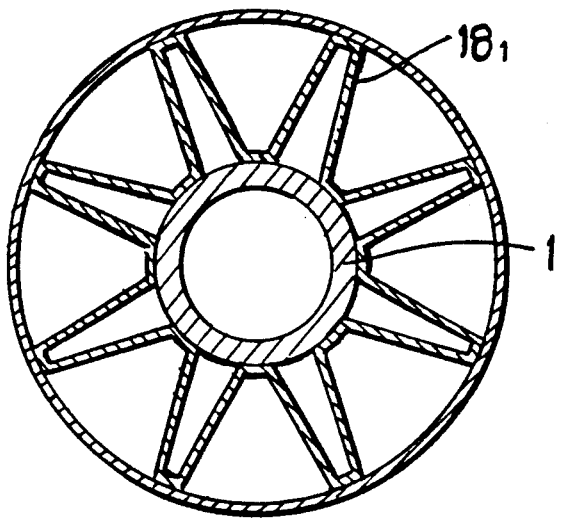
FIG. 2 is an axial view of a second embodiment of gearwheel.
Figure 3:
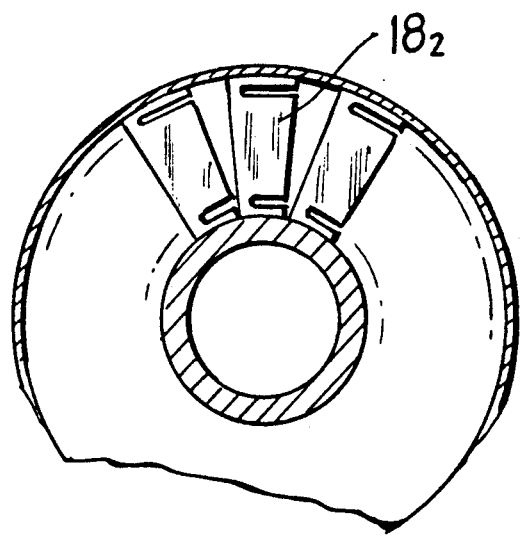
FIG. 3 is a partial axial view of a third embodiment.

FIGS. 2 and 3 respectively illustrate continuous 18$_1$ and individual 18$_2$ reinforcing ribs. These ribs can take many configurations, and can be folded and chamfered.

Figure 4:
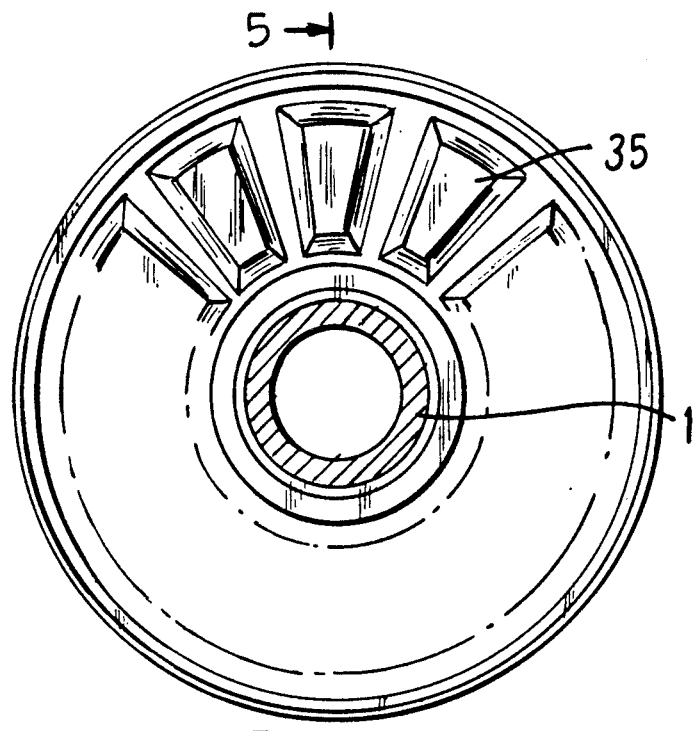
FIG. 4 is an axial view along 4—4 in FIG. 1.
Figure 5:
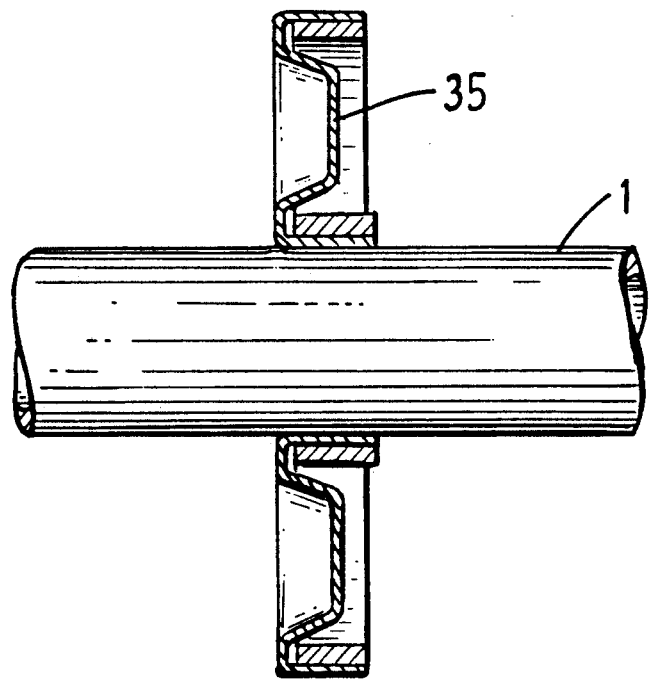
FIG. 5 is a section along 5—5 in FIG. 4.

FIG. 4 shows an axial view of the disc member 21 having reinforcing formations 35 provided therein. A cross-section showing the form of the reinforcing formations 35, is provided in FIG. 5.

While the invention has been illustrated and described as embodied in a gearwheel, it is not intended to be limited to the details shown, since various modifications and structural changes may be made without departing in any way from the spirit of the present invention.

Without further analysis, the foregoing will so fully reveal the gist of the present invention that other can, by applying current knowledge, readily adapt it for various applications without omitting features that, from the standpoint of prior art, fairly constitute essential characteristics of the generic or specific aspect of this invention.

What is claimed as new and desired to be protected by letters patent is set forth in the appended claims.

1. A gearwheel attached to an expanded tube portion in a force-locking way, comprising:
    at least one plate metal disc member having an outer peripheral edge and a cylindrical hub portion in contact with the tube portion;
    a supporting ring slid upon the hub portion so that said hub portion is held between said supporting ring and said tube portion, said supporting ring having a yield strength higher than that of the tube portion; and
    at least one gear ring attached to the outer peripheral edge of the disc member.

2. A gearwheel according to claim 1, wherein several disc members each having a cylindrical hub portion are connected to form a gearwheel.

3. A gearwheel according to claim 2, wherein several gear rings are attached to an outer peripheral edge of the gearwheel member consisting of several disc members.

4. A gearwheel according to claim 1, wherein a gear ring is slid on and attached to an outer peripheral edge of the at least one disc member.

5. A gearwheel according to claim 1, and further comprising an expanding ring inserted into the at least one disc member so as to pretension a gear ring and the disc member relative to each other.

6. A gearwheel according to claim 1, wherein the disc members have a Z-shaped longitudinal section.

7. A gearwheel according to claim 1, wherein the disc members have a C-shaped longitudinal section.

8. A gearwheel according to claim 1, wherein the disc member is formed so as to have a longitudinal section that defines a closed shape relative to the tube portion.

9. A gearwheel according to claim 8, wherein the gearwheel is composed of several disc members with at least one of a Z-shaped and a C-shaped longitudinal section.

10. A gearwheel according to claim 1, wherein the disc members have reinforcing means.

11. A gearwheel according to claim 1, wherein the disc members have dish-shaped regions, and further comprising one of individual and continuous reinforcing ribs inserted into the dish-shaped regions of the disc members.

12. A gearwheel according to claim 11, wherein the ribs are repeatedly folded.

13. A gearwheel according to claim 11, wherein the ribs are repeatedly chamfered.

* * * * *